(12) United States Patent
Attar et al.

(10) Patent No.: US 8,175,594 B2
(45) Date of Patent: May 8, 2012

(54) ACTIVE SET MANAGEMENT WITH HOTSPOT CARRIERS

(75) Inventors: Rashid Ahmed Akbar Attar, San Diego, CA (US); Peter John Black, San Diego, CA (US); Donna Ghosh, San Diego, CA (US); Christopher Gerard Lott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 12/582,557

(22) Filed: Oct. 20, 2009

(65) Prior Publication Data
US 2010/0105336 A1   Apr. 29, 2010

Related U.S. Application Data

(60) Provisional application No. 61/108,291, filed on Oct. 24, 2008.

(51) Int. Cl.
*H04W 4/00* (2009.01)

(52) U.S. Cl. .................. 455/432.1; 455/115.3

(58) Field of Classification Search .......... 455/436, 455/69, 522, 432.1, 422.1, 435.2, 11.3, 115.1
See application file for complete search history.

(56) References Cited

U.S. PATENT DOCUMENTS

| 7,436,803 | B2 | 10/2008 | Chae et al. | |
|---|---|---|---|---|
| 2006/0128312 | A1* | 6/2006 | Declerck et al. | 455/67.11 |
| 2007/0066232 | A1* | 3/2007 | Black | 455/67.11 |
| 2009/0275337 | A1* | 11/2009 | Maeda et al. | 455/442 |

FOREIGN PATENT DOCUMENTS

| EP | 1058408 A1 | 12/2000 |
|---|---|---|
| EP | 1784041 | 5/2007 |
| WO | WO9512297 | 5/1995 |
| WO | WO0018173 | 3/2000 |
| WO | WO03094540 A1 | 11/2003 |

OTHER PUBLICATIONS

International Search Report & Written Opinion—PCT/US09/061676, International Search Authority—European Patent Office—Feb. 18, 2010.

* cited by examiner

*Primary Examiner* — Tu X Nguyen
(74) *Attorney, Agent, or Firm* — Jeffrey D. Jacobs (57) ABSTRACT

Techniques for managing communications in a cellular network are disclosed. The cellular network can include one or more sectors in which hotspot carriers are deployed. The hotspot carriers can be available to mobile devices beyond sector boundaries defined by the signal strength of ubiquitous carriers. A mobile device can measure a signal strength of a candidate hotspot carrier and estimate a reverse link mobile device transmit power level for communicating on the hotspot carrier. The mobile device may determine whether to add, remove, or maintain the hotspot carrier in its active set based on the estimated transmit power level so as to limit interference to the reverse link of non-hotspot sectors.

33 Claims, 7 Drawing Sheets

ACTIVE SET MANAGEMENT WITH HOTSPOT CARRIERS

CROSS-REFERENCES TO RELATED APPLICATIONS

This application claims the benefit of U.S. Provisional Application No. 61/108,291, filed Oct. 24, 2008, entitled "Active Set Management Rule for Addition/Deletion of Hotspot Carrier from Active Set in Hotspot/Partial-Overlay Deployments for 1xEV-DO RevB," which is incorporated herein by reference for all purposes.

BACKGROUND

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of terminals. The system may support operation on multiple carriers. Each carrier may be associated with a particular center frequency and a particular bandwidth. Each carrier may carry pilot and overhead information to support operation on the carrier. Each carrier may also carry data for terminals operating on the carrier. Some transmissions between a terminal and a base station may cause interference to, and may also observe interference from, other transmissions in the communication system. The interference may adversely impact the performance of all affected base stations.

SUMMARY

Techniques for managing communications in a cellular network are disclosed. The cellular network can include one or more sectors in which hotspot carriers are deployed. The hotspot carriers can be available to mobile devices beyond sector boundaries defined by the signal strength of ubiquitous carriers. A mobile device can measure a signal strength of a candidate hotspot carrier and estimate a reverse link mobile device transmit power level for communicating on the hotspot carrier. The mobile device may determine whether to add, remove, or maintain the hotspot carrier in its active set based on the estimated transmit power level so as to limit interference to the reverse link of non-hotspot sectors.

In an exemplary embodiment, a method of communicating in a cellular network is disclosed. The method includes receiving a candidate carrier signal from a first base station at a mobile device and determining a first power level associated with the candidate carrier. The method also includes determining a difference between the first power level and a second power level corresponding to a second carrier used by the mobile device to communicate with a second base station. The method includes updating a set of carriers used by the mobile device for communicating on the cellular network based on the difference between the first power level and the second power level. Determining the first power level can include estimating a reverse link transmit power level for communicating with the first base station. Determining the second power level can include estimating a reverse link transmit power level for communicating with the second base station. Updating the set of carriers can include adding information about the candidate carrier when the difference is less than a predetermined value and removing information about the candidate carrier when the difference is greater than a predetermined threshold.

In another embodiment, a mobile device is disclosed. The mobile device includes a receiver that receives forward link carrier signals associated with base stations in a cellular network and a transmitter that transmits reverse link carrier signals corresponding to the forward link carriers. The mobile device includes a processor coupled to the receiver and to the transmitter that decodes the forward link carriers and sends data on the corresponding reverse link carriers based on an active carrier set. The mobile device also includes a memory that stores an active carrier set including information about carriers that are available to the mobile device for communicating on the cellular network. The processor estimates a transmit power level of a reverse link signal corresponding to a candidate forward link carrier, and updates the active carrier set based on a difference between the estimated transmit power level and a power level associated with a reference carrier in the active set.

In still another embodiment, a method of wireless communication performed by a mobile device is disclosed. The method includes communicating with a first base station on a first carrier and detecting the availability of a hotspot carrier. The method includes measuring a forward link pilot power level of the hotspot carrier and estimating a reverse link transmit power of the hotspot carrier based on the forward link pilot power. The method includes adding information relating to the hotspot carrier to an active set of the mobile device in response to the forward link pilot power level of the hotspot carrier exceeding a first threshold and a difference between the estimated reverse link transmit power on the hotspot carrier and a reverse link transmit power for communicating with the first base station being below a second threshold. The method also includes removing information relating to the hotspot carrier from the active set of the mobile device in response to the forward link pilot power level of the hotspot carrier being less than the first predetermined threshold value or the difference between the estimated reverse link transmit power on the hotspot carrier and the reverse link transmit power for communicating with the first base station exceeding the second threshold.

In the figures, similar components and/or features may have the same reference label. Also, various components of the same type may be distinguished by following the reference label with a dash and a second label for distinguishing among the similar components. If only the first reference label is used, the description is applicable to any of the similar components designated by the first reference label.

DETAILED DESCRIPTION

The techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95 and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for HRPD.

Figure 1:
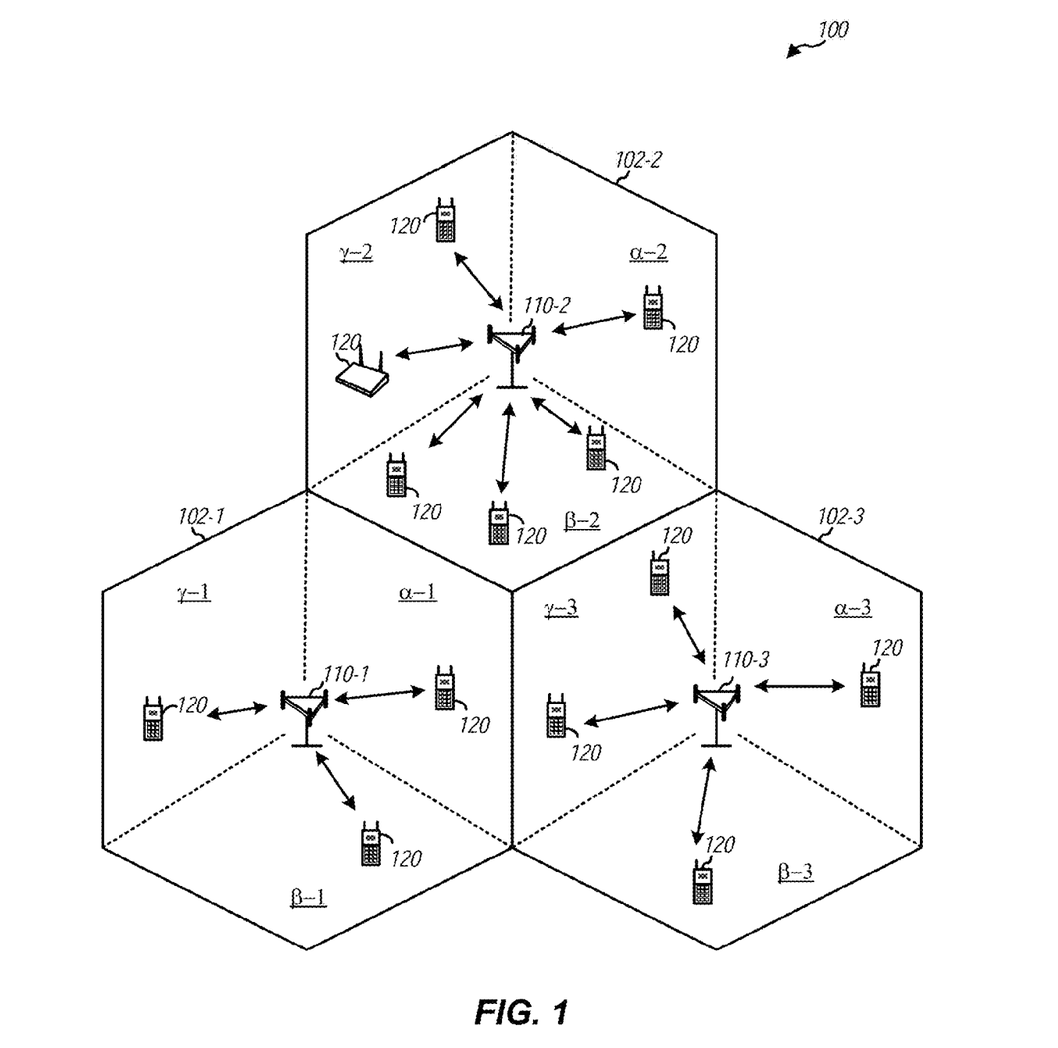
FIG. 1 shows a wireless communication system.

FIG. 1 shows a wireless communication system 100 with multiple base stations 110. System 100 may support operation on multiple carriers. A multi-carrier transmitter can transmit one or multiple modulated signals simultaneously on the multiple carriers. Each modulated signal may be a CDMA signal, a TDMA signal, an OFDMA signal, a SC-FDMA signal, etc. Each modulated signal may be sent on a different carrier and may carry pilot, overhead information, data, etc. In an exemplary embodiment, system 100 includes elements of a multi-carrier 1xEV-DO Rev. B network and may support hotspot carrier deployments, partial system overlays, and other network variations.

A base station 110 may be a station that communicates with the terminals and may also be referred to as an access point, a Node B, an evolved Node B (eNB), etc. Each base station 110 can provide communication coverage for a particular geographic area. To improve system capacity, the overall coverage area 102 of base stations 110 may be partitioned into multiple (e.g., three) smaller areas. Each smaller area may be served by a respective base station subsystem. The term "cell" is used herein to refer to the coverage area 102 served by a base station and/or a base station subsystem. The term "sector" or "cell-sector" refers to the smallest coverage area of a base station 110 and/or a base station subsystem. For illustration purposes, the coverage area 102 of each base station 110 is divided into sectors $\alpha$, $\beta$, and $\gamma$.

System 100 may include only macro base stations or it can have base stations of different types, e.g., macro, pico, and/or femto base stations. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

Access terminals ("terminals") 120 can be dispersed throughout system 100 and may also be referred to as mobile stations, mobile devices, user equipment (UE), or subscriber units. Terminals 120 can include cellular phones, personal digital assistants (PDAs), wireless communication devices, handheld devices, netbooks, notebook computers, and the like.

Terminals 120 communicate with one or more base stations 110 via forward and reverse links. The forward link (or downlink) refers to the communication link from a base station 110 to a terminal 120, and the reverse link (or uplink) refers to the communication link from a terminal 120 to a base station 110. The term "active set" can refer to the set of carriers on which a terminal 120 communicates. The active set can include sector-carrier pairs corresponding to base stations 110 which will decode transmissions from a terminal 120 on the uplink and which can be selected by the terminal 120 to receive downlink transmissions. Note that in 1xEV-DO Rev. B networks soft-handoff, terminals 120 select one sector in each carrier from the active set to receive downlink communications. By contrast, on the reverse link, each sector in a terminal's active set will attempt to decode its reverse link transmissions and power control the access terminal's transmit pilot power on the reverse link.

Traffic levels in system 100 can vary from cell-to-cell and from sector-to-sector. In the exemplary system, sector $\beta$-2 is shown as having a relatively higher traffic volume than neighboring sectors $\alpha$-1 or $\gamma$-3. To meet the higher demand for service, base station 110-2 can be provisioned with a hotspot carrier in sector $\beta$-2. A hotspot carrier can refer to a carrier not available in neighboring sectors. For example, a frequency f1 may be ubiquitous in system 100 in that it is utilized by base stations 110-1, 110-2, and 110-3 in neighboring sectors $\alpha$-1, $\beta$-2, and $\gamma$-3. However, a hotspot carrier f2 may be deployed at base station 110-2 in sector $\beta$-2 and not available from base stations 110-1 or base station 110-3 in the neighboring sectors. As such, the hotspot carrier f2 would not be regarded as ubiquitous.

Hotspot carriers may exhibit different interference patterns than ubiquitous carriers and can provide extended coverage areas and load balancing flexibility. Ubiquitously deployed carriers are subjected to interference from all neighbor sector transmissions. However, a hotspot carrier is subjected to such cross-sector interference only from neighbor sectors in which the same hotspot carrier has been deployed. Thus, hotspot carriers generally have less interference when compared to ubiquitous carriers. As a result of the reduced interference, hotspot carriers may have extended coverage areas as compared to ubiquitous carriers at a given transmit power level.

Figure 2:
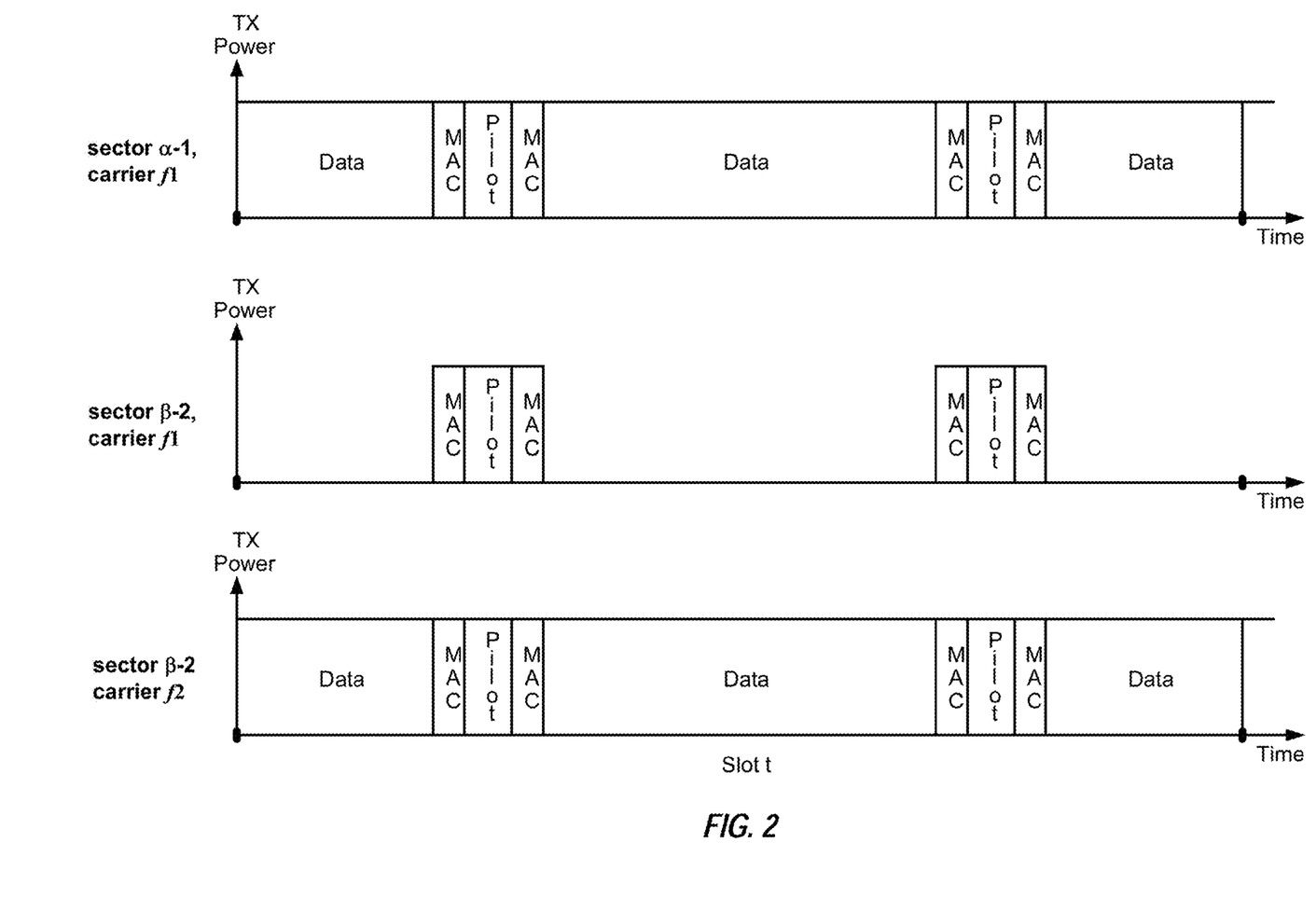
FIG. 2 shows transmission of pilot and overhead information by two sectors.

FIG. 2 shows an exemplary transmission of pilot and overhead information by sectors $\alpha$-1 and $\beta$-2. In the example, base station 110-1 transmits on frequency f1 whereas base station 110-2 transmits on both frequency f1 and hotspot carrier f2. The transmission timelines for the sectors $\alpha$-1, $\beta$-2 are partitioned into slots, with each slot having a duration of 1.67 milliseconds (ms) and covering 2048 chips at 1.2288 Mcps. Each slot is divided into two half-slots, and each half-slot includes a pilot burst. The pilot is known a priori by base stations 110 and terminals 120 and is transmitted at a fixed power level. Signaling bursts (denoted as "MAC") are transmitted on both sides of each pilot burst. Data may be transmitted in the remaining portion of each half-slot.

Each terminal 120 can monitor the forward link pilot signal-to-noise ratio of each carrier in each sector. When the signal-to-noise ratio of the pilot exceeds a predetermined threshold, terminal 120 can add the sector-carrier pair to its active set. Hotspot carriers are preferably added to the active set quickly. However, once added, the hotspot sector will attempt to decode reverse link transmissions from terminal 120 and will affect the transmit power level of reverse link transmissions from terminal 120 on the hotspot carrier. For example, base station 110-2 will attempt to decode reverse link transmissions from a mobile terminal when the terminal adds sector-carrier ($\beta$-2,f2) to its active set. This can cause adjacent channel interference on the reverse link, for example, to the reverse link of base station 110-1 which may be closer to the terminal in terms of path loss. Such interference may be indistinguishable from other types of interference at base station 110-1 and can lead to a reduced system capacity on the reverse link. Techniques described herein can limit this undesirable effect.

Figure 3:
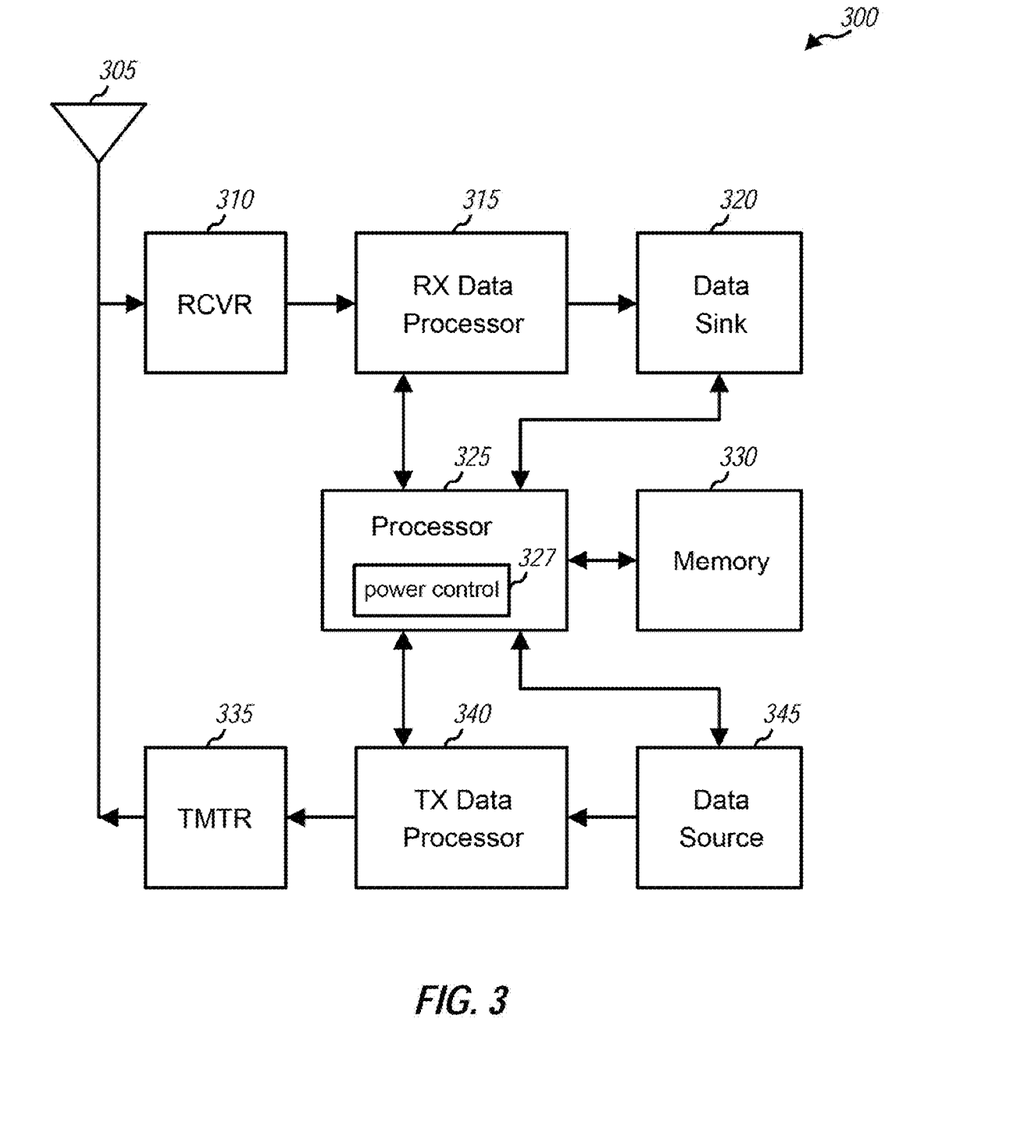
FIG. 3 shows a mobile device.

FIG. 3 is a block diagram of a mobile device 300. Mobile device 300 can be an access terminal 120 that operates in communication system 100. In some embodiments, mobile device 300 is configured to process signals having a format as specified by the IS-856 and TIA-856 standards.

Antenna 305 can receive forward link signals from a base station 110 and/or a base station subsystem. A receiver (RCVR) 310 may process the forward link signals from antenna 305 and provide input samples. A receive (RX) data processor 315 may process the input samples (e.g., for CDMA, OFDMA, etc.) to obtain received symbols. RX data processor 315 may further process (e.g., demodulate, deinterleave, and decode) the received symbols, provide decoded data to a data sink 320, and provide decoded overhead information to a controller/processor 325.

A TX data processor 340 may receive data from a data source 345 and control information (e.g., a data rate request, CQI information, power control, etc.) from controller/processor 325. TX data processor 340 may process the data and control information and generate output samples. A transmitter (TMTR) 335 may process the output samples and generate a reverse link signal. The reverse link signal may be transmitted via antenna 305 to a base station 110.

Controllers/processor 325 directs the operation of mobile device 300. Among its functions, processor 325 manages the active set and determines when the active set should be updated. For example, processor 325 can determine when to add a candidate carrier to the active set and when to remove an existing carrier from the active set. A memory 330 is coupled to processor 325 and stores the active set. Memory 330 can also store program code and other data for mobile device 300. Processor 325 accesses data and program instructions in memory 330 and can execute program instructions to carry out the operations described herein. Memory 330 may include one or more volatile or non-volatile computer-readable storage elements on which the data and program instructions are encoded.

Processor 325 periodically monitors the pilot strength of all sector-carrier pairs detected by receiver 310. The pilot channel of each sector can be distinguished from other sectors by the pseudo-random number (PN) of its base station 110. This enables the mobile device 300 to identify different sectors on a same carrier and to recognize a hotspot carrier or partial overlay network. Processor 325 may determine signal strength according to a signal-to-noise ratio such as energy-per-chip-to-total-received-power (Ec/Io) or other measurement obtained from receiver 310 and RX data processor 315.

Processor 325 may compare the signal-to-noise ratio to a first threshold value. The first threshold can indicate whether mobile device 300 can properly receive and decode forward link transmissions from a particular sector 102 on a particular carrier. For those carriers that exceed the first threshold, processor 325 can estimate a corresponding reverse link transmit power.

A power control module 327 of processor 325 can include an open-loop power control circuit for estimating reverse link transmit power based on the forward link pilot channel. Since the forward link pilot power is known a priori to mobile device 300, pilot strength provides an indication of path loss. Power control module 327 may determine the reverse link transmit power needed to invert the path loss in the prevailing RF environment. Power control module 327 can also include one or more closed-loop power control circuits for adjusting the reverse link transmit power of carriers in the active set according to base station power control commands, quality of service requirements, packet error rates, etc.

As previously noted, in 1xEV-DO systems, a mobile device selects a particular base station 110 from which to receive forward link signals but can transmit on the reverse link to all base stations 110 in its active set. Consequently, adjacent channel interference on the reverse link of nearby sectors can result when there is a large transmit power differential between sector-carriers in the active set. For example, when mobile device 300 is located relatively far from a hotspot sector in terms of path loss, power control module 327 may estimate that a high reverse link transmit power level is needed. However, using a high transmit power to communicate on the hotspot carrier can interfere with reverse link transmissions to a nearby sector. This interference can reduce capacity at the nearby sector and negatively affect overall system performance.

Processor 325 can perform a comparison between the reverse link transmit power level of an existing or candidate signal in the hotspot carrier and the transmit power used to communicate with non-hotspot carriers on the reverse link. For example, processor 325 can determine the power differential as the difference between the estimated reverse link transmit power on the hotspot carrier and a minimum reverse link transmit power of sector-carriers in the active set. Preferably, average transmit power levels are used for comparison. For example, the mobile device can determine an average reverse link transmit power level by filtering in the linear domain with a single-pole IIR (infinite impulse response) filter having a predetermined time constant such as 500 ms.

The power differential can be used as a safety check on reverse link transmit power. Processor 325 may compare the reverse link transmit power differential to a second threshold value. If the reverse link transmit power differential exceeds the second threshold, a candidate carrier is not added to the active set or an existing carrier is removed from the active set. For example, processor 325 may decline or drop a carrier from the active set when the reverse link power difference exceeds a maximum reverse link transmit power differential. For example, processor 325 may not add the hotspot carrier if the power differential exceeds of 18 dB or some other predetermined value. On the other hand, if the reverse link power difference does not exceed the second threshold, processor 325 may add the candidate carrier to the active set or maintain the existing carrier in the active set.

Figure 4:
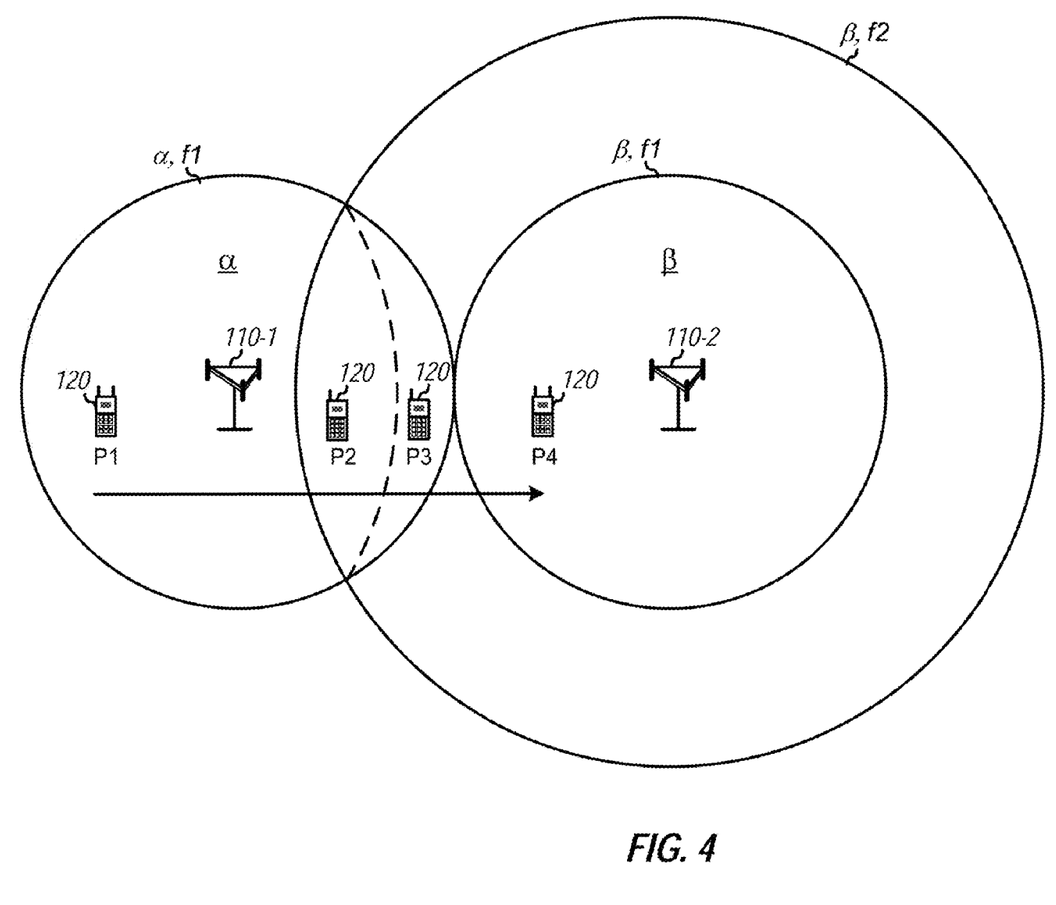
FIG. 4 shows aspects of communication between a mobile device and two sectors.

FIG. 4 shows aspects of active set management. In the figure, neighboring sectors alpha a and beta $\beta$ of a multicarrier 1xEV-DO system are shown. Carrier f1 is ubiquitous; its coverage area in sectors α, β is represented by circles that are labeled with sector-carrier pairs (α, f1), (β,f1). Carrier f2 is a hotspot carrier or partial overlay deployed at base station 110-2. Its coverage area is represented by the larger circle labeled (β,f2). Additional aspects of this arrangement can be appreciated with reference system 100 (FIG. 1).

As illustrated in FIG. 4, the coverage area of hotspot carrier f2 is much larger than either of the f1 coverage areas and extends into sector a from sector β. This can be a result of the mutual interference between sectors α, β on the ubiquitous f1 carrier. In this exemplary two-sector context, f2 is limited only by thermal interference and can penetrate well into neighboring sectors. Due to a more limited deployment, hotspot carriers such as (β,f2) may experience lesser interference from other sectors as compared with ubiquitous carriers such as f1. As a result, when the same transmit power level is used across base stations 110, the coverage of the hotspot carrier may be larger than that of the ubiquitous carriers in a same sector. Additionally, the forward link signal strength for mobile devices located at cell edge in the hotspot carrier may be much larger than the forward link signal strength in the ubiquitous carriers.

From the standpoint of a system operator, the combination of expanded coverage and increased availability at cell edge of hotspot carriers offers opportunities for improving service and may provide greater flexibility for load balancing and resource allocation. Thus, when possible, it is desirable to utilize the full natural extent of the hotspot coverage area, and to selectively schedule mobile devices at cell edge (as defined by the ubiquitous carrier coverage) on the hotspot carrier where they have higher signal strengths relative to ubiquitous carriers.

A mobile device 120 is initially located at position P1 within sector α. At point P1, mobile device 120 is served by base station 110a on ubiquitous carrier f1 and thus holds information about (α,f1) in its active set. When mobile device 120 moves from point P1 to point P2, it crosses into the coverage area of hotspot carrier (β,f2). For example, at position P2, the hotspot carrier can be detected by receiver 310 (FIG. 3) and processor 325 can determine that its forward link pilot strength exceeds a threshold level for addition to the active set. Thus, at point P2, mobile device 120 could add (β,f2) to its active set.

However, before the hotspot carrier is added, power control module 327 estimates a transmit power level of the corresponding reverse link signal. Since P2 is relatively far from base station 110-2, a significant path loss may be present. Power control module 327 may estimate a reverse link power level to invert the path loss using open-loop power control in the prevailing RF environment. Processor 325 can then determine a power difference between the reverse link transmit power on (α,f1) and the estimated reverse link transmit power on (β,f2). For example, processor 325 can subtract the reverse link power levels to arrive at a power differential.

At point P2, it is assumed that the power differential exceeds the second threshold. As a result, adding (β,f2) to the active set at point P2 would likely cause adjacent channel interference to reverse link transmissions on (α,f1) and could reduce the reverse link capacity of base station 110-1 to serve other terminals in sector a on the reverse link of f1. Thus, although it may be desirable to add (β,f2) to the active set as soon as possible, processor 325 declines to add the hotspot carrier to its active set at point P2.

When mobile device 120 moves from point P2 to some other point P3, the reverse link power differential falls below the second threshold. This is represented in the example by dashed lines that mark a boundary within sector α at which the reverse link power differential is crossed. At point P3, reverse link transmissions on (β,f2) will not cause a harmful level of interference to reverse link (α,f1) and therefore processor 325 adds hotspot carrier (β,f2) to the active set.

As mobile device 120 continues toward point P4, the signal-to-noise-and-interference ratio (SINR) of (α,f1) increases and (α,f1) is no longer the best link. At that point, a virtual soft handoff can be performed and base station 110-2 can be selected as the serving base station in sector β. Because base station 110-2 transmits both ubiquitous carrier f1 and hotspot carrier f2, path loss conditions are the same and adjacent channel interference issues on the reverse link are not present. Thus, at point P4 the active set of mobile device 120 includes both (β,f1) and (β,f2).

A similar process can be performed in the opposite direction. When mobile device 120 moves from point P4 to point P3, a virtual soft handoff between base stations 110 can be performed with base station 110-1 becoming the serving base station on ubiquitous carrier f1. Hotspot carrier (β,f2) can be maintained in the active set as the reverse power differential does not exceed the second threshold value. As mobile device 120 continues from point P3 to point P2, the reverse power differential exceeds the threshold and hotspot carrier (β,f2) is removed from the active set.

Accordingly, mobile device 120 may perform separate checks before adding a candidate hotspot carrier to its active set. In a first check, its power control module 327 can determine a forward link pilot strength or Ec/Io of the hotspot carrier. Processor 325 can compare the pilot strength to an add threshold. If the pilot strength exceeds the add threshold, processor 325 can obtain an estimated reverse link transmit power on the hotspot carrier and can perform a safety check in relation to reverse link transmissions to other sectors in the active set. As conditions change, processor 325 can monitor the active set and can drop a hotspot or overlay carrier based either on the first threshold of forward link pilot strength or the second threshold of reverse link transmit power.

Figure 5:
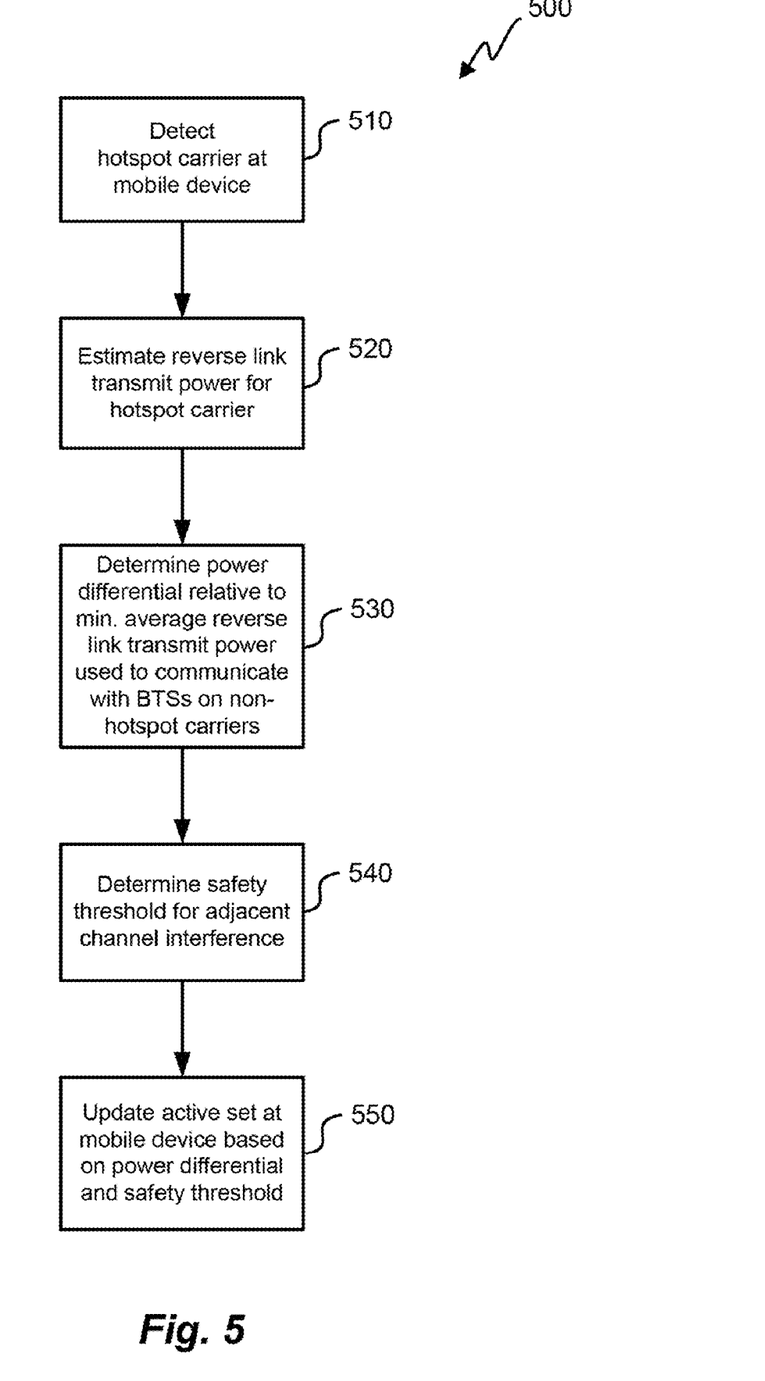
FIG. 5 shows a process for active set management by a mobile device.

FIG. 5 shows a process 500 by which the active set is updated. Process 500 can be performed by the processor 325 and other elements of mobile device 120 operating within communication system 100. At block 510, the mobile device 120 detects a hotspot carrier. The hotspot carrier can originate from a neighboring sector 102 and may be detected when its forward link pilot power exceeds a predetermined SNR threshold. At block 520, mobile device 120 estimates a reverse link transmit power on the hotspot carrier. The reverse link power estimate can be based on a path loss inversion determined by an Ec/Io measurement of the hotspot pilot.

A power difference between the estimated reverse link transmit power on the hotspot carrier and the reverse link transmit power levels used to communicate on other sector-carriers in the active set is determined at block 530. Preferably, the power differential is computed relative to a minimum reverse link transmit power across all non-hotspot sector-carriers in the active set. The reverse link transmit power used to communicate with base stations in the active set may be determined according to open-loop and closed-loop power control circuitry including base station power control commands, quality of service indicators, packet error rate control, and prevailing conditions in the RF environment. Both the estimated reverse link transmit power on the candidate hotspot carrier and the minimum reverse link transmit power for non-hotspot carriers in the active set may be average values that can be generated by filtering power measurements in the linear domain with a single-pole IIR filter having a predetermined time constant (e.g., 500 ms), or other signal processing techniques.

A reverse link safety threshold is determined at block 540. The safety threshold may balance the need to utilize the hotspot carrier against the potential for interference due to its reverse link power requirements. The safety threshold can be a fixed value or it can be tailored to a particular communication system. The safety threshold can also be determined as a function of frequency spacing in communication network 100. The power differential of the reverse link transmit power required on the hotspot carrier minus that required on ubiquitous carriers may be compared to the safety threshold. As previously noted, in the presence of multiple carriers, the reverse link power differential may be computed between the reverse link transmit power on the hotspot carrier and the minimum reverse link transmit power over all the other carriers in the active set.

A lookup table may be stored in memory 330 which maps frequency spacing to a suitable reverse link threshold. The reverse link threshold can be higher or lower depending upon the existence and size of guard bands. In a system with large guard bands, the threshold is preferably relatively large permitting mobile device 120 to be more aggressive in adding or maintaining a hotspot carrier in its active set. On the other hand, with closer frequency spacing, a relatively small threshold is preferably used to reduce the possibility of harmful adjacent channel interference.

At block 550, the active set is updated. Depending upon the power differential, the hotspot carrier can be added to, removed from, or maintained as part of the active set.

Figure 6:
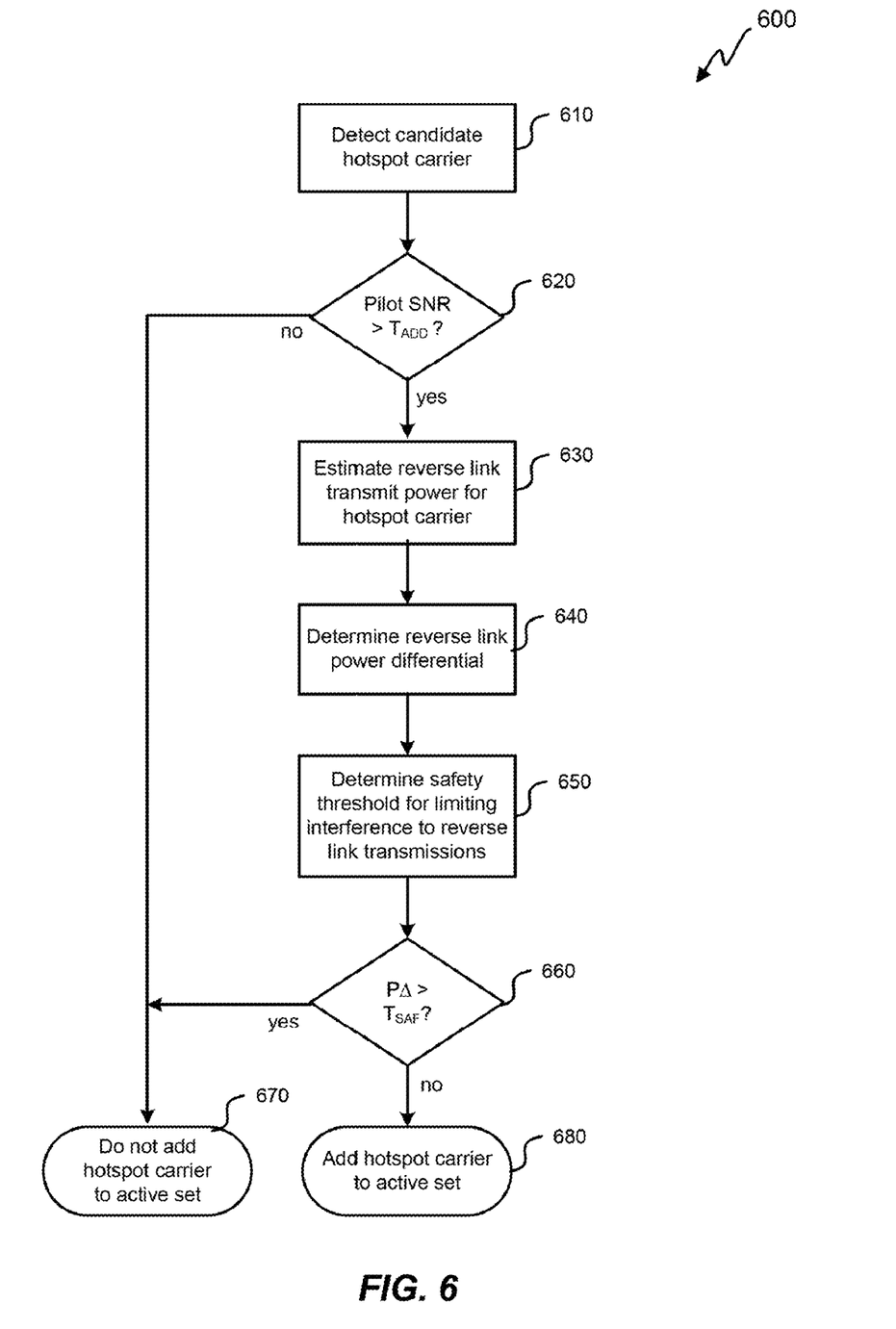
FIG. 6 shows a process for adding a hotspot carrier to the active set.

FIG. 6 shows a process 600 by which a candidate hotspot carrier is added to the active set. Process 600 is performed by processor 325 and other elements of mobile device 300 operating as part of communication system 100. The candidate hotspot carrier is detected by receive circuitry such as receiver 325 at block 610. At block 620, the SNR of the hotspot carrier pilot channel is determined and compared to a threshold value for communicating on network 100. If the pilot SNR is not greater than the threshold, then the hotspot carrier is not added to the active set, block 670, and process 600 is complete.

At blocks 630 and 640, the hotspot carrier reverse link power is estimated from the forward link signal and a power differential $P\Delta$ is determined. The power differential relates the estimated reverse link transmit power on the hotspot carrier to the reverse link power corresponding to nearby base stations.

A safety threshold $T_{SAF}$ for adjacent channel interference is determined at block 650 and compared at block 660 to power differential $P\Delta$. If the power differential exceeds the safety threshold ($P\Delta > T_{SAF}$) then, at block 670, the hotspot carrier is not added to the active set. This condition, for example, may correspond to point P2 of FIG. 4. On the other hand, if the power differential is equal to or below the safety threshold ($P\Delta < T_{SAF}$), then the hotspot carrier is added to the active set at block 680. This condition may correspond to point P3 of FIG. 4.

Figure 7:
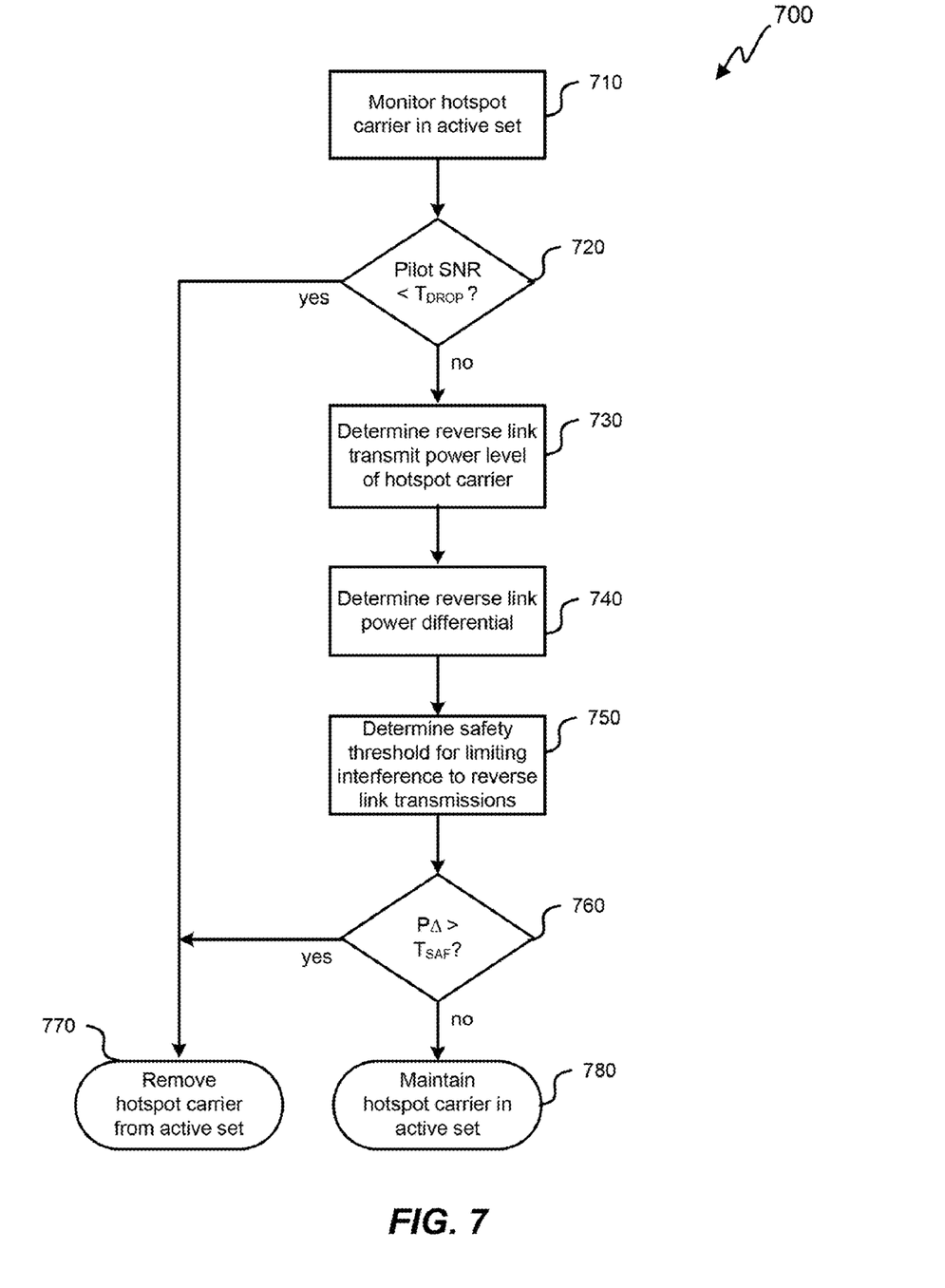
FIG. 7 shows a process for removing a hotspot carrier from the active set.

FIG. 7 shows a process 700 by which a hotspot carrier is removed from the active set. Process 700 can be performed by processor 325 and other elements of mobile device 300 operating within communication system 100. At block 710, the pilot power of the active set hotspot carrier is monitored. If at block 720 it is determined that the pilot SNR drops below a predetermined threshold ($T_{DROP}$), then the hotspot carrier is removed from the active set at block 770 and the process ends. Otherwise, processing continues at block 730.

At block 730, the hotspot carrier reverse link transmit power is determined. Since the hotspot carrier is already in the active set, the reverse link power need not be estimated and can be based on feedback from the hotspot sector and prevailing RF conditions. At blocks 740, 750, 760, the reverse link power differential $P\Delta$ is determined and compared to a safety threshold $T_{SAF}$ for adjacent channel interference. As with process 600, the power differential can be determined by subtracting the minimum reverse link transmit power of non-hotspot sector-carriers in the active set from the estimated reverse link transmit power on the hotspot carrier using average values.

If the reverse link power differential exceeds the safety threshold ($P\Delta > T_{SAF}$), then at block 770 the hotspot carrier is removed from the active set. This condition, for example, may correspond to movement from point P3 to point P2 as discussed in connection with FIG. 4. On the other hand, if the power differential does not exceed the safety threshold ($P\Delta \leq T_{SAF}$), then at block 780 the hotspot carrier is maintained in the active set.

The various illustrative logical blocks, modules, circuits, and algorithm steps described in connection with the disclosure herein may be implemented as electronic hardware, computer software executed by a processor, or combinations of both elements. To clearly illustrate this interchangeability of hardware and software, various illustrative components, blocks, modules, circuits, and steps have been described above generally in terms of their functionality. Whether such functionality is implemented as hardware or software executed by a processor depends upon the particular application and design constraints imposed on the overall system. The described functionality may be implemented in varying ways for each particular application, but such implementation decisions should not be interpreted as causing a departure from the scope of the disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The blocks of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software executed by a processor, firmware, or any combination thereof. If implemented in software executed by a processor, the functions may be stored on or transmitted over as one or more instructions or code on a computer-readable medium. Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. A method of communicating in a cellular network, the method comprising:
   receiving a candidate carrier from a first base station at a mobile device;
   determining at the mobile device a first reverse link transmit power level associated with the candidate carrier based on a pilot power level of the received candidate carrier;
   determining at the mobile device a difference between the first reverse link transmit power level and a second reverse link transmit power level corresponding to a second carrier used by the mobile device to communicate with a second base station; and
   updating at the mobile device a set of carriers available to the mobile device for communicating on the cellular network based on the difference between the first reverse link transmit power level and the second reverse link transmit power level.

2. The method of claim 1, wherein determining the first power level comprises estimating the transmit power level for reverse link communication with the first base station on the candidate carrier.

3. The method of claim 2, wherein determining the difference further comprises comparing the estimated first reverse link transmit power level for reverse link communication with the second reverse link transmit power level for reverse link communication with the second base station on the second carrier.

4. The method of claim 1, wherein the updating comprises adding information about the candidate carrier to the set of carriers in response to the difference being less than a predetermined value.

5. The method of claim 1, wherein the updating comprises removing information about the candidate carrier from the set of carriers in response to the difference being greater than a predetermined value.

6. The method of claim 1, wherein receiving the candidate carrier further comprises determining a power level of a forward link pilot from the first base station.

7. The method of claim 6, wherein updating the set of carriers comprises adding information about the candidate carrier in response to the difference being less than a predetermined value and the power level of the forward link pilot from the first base station exceeding a second threshold.

8. The method of claim 6, wherein updating the set of carriers comprises removing information about the candidate carrier from the set of carriers in response to the difference exceeding a predetermined value or the power level of the forward link pilot from the first base station being below a second threshold.

9. The method of claim 1, wherein the set of carriers is updated in response to the difference exceeding a predetermined value based on a frequency spacing of the cellular network.

10. The method of claim 1, wherein the set of carriers includes information relating to at least one base station and frequency pair.

11. The method of claim 1, wherein the second base station transmits only on one or more frequencies other than frequencies of the candidate carrier.

12. The method of claim 1, wherein the mobile device is configured to process signals having a format as specified by TIA-856 (Telecommunications Industry Association) standards.

13. The method of claim 1, wherein the candidate carrier comprises a hotspot carrier or a partial overlay carrier of the cellular network.

14. The method of claim 1, wherein the first power level comprises an average of an estimated transmit power for reverse link communication with the first base station and the second power level comprises an average of the transmit power for reverse link communication with the second base station.

15. The method of claim 14 wherein determining the difference comprises subtracting the first power level from the second power level or subtracting the second power level from the first power level.

16. The method of claim 14, further comprising filtering the first power level to determine the average of the estimated transmit power for reverse link communication with the first base station and filtering the second power level to determine the average of the transmit power for reverse link communication with the second base station.

17. A mobile device operative for wireless communication on a cellular network, the mobile device comprising:
   means for receiving a candidate carrier from a first base station;
   means for determining a first reverse link transmit power level associated with the candidate carrier based on a pilot power level of the received candidate carrier;
   means for determining a difference between the first reverse link transmit power level and a second reverse link transmit power level corresponding to a second carrier used by the mobile device to communicate with a second base station; and means for updating a set of carriers available to the mobile device for communicating on the cellular network based on the difference between the first reverse link transmit power level and the second reverse link transmit power level.

18. The mobile device of claim 17, wherein the means for determining the first power level comprises means for estimating the first reverse link transmit power level for reverse link communications with the first base station.

19. The mobile device of claim 18, further comprising means for comparing the estimated first reverse link transmit power level to the second reverse link transmit power level for reverse link communications with the second base station.

20. The mobile device of claim 17, wherein the means for updating comprises means for adding information about the candidate carrier to the set of carriers in response to the difference being less than a predetermined value.

21. The mobile device of claim 17, wherein the means for updating comprises means for removing information about the candidate carrier from the set of carriers in response to the difference being greater than a predetermined value.

22. The mobile device of claim 17, wherein the means for receiving the candidate signal further comprises means for determining a power level of a forward link pilot from the first base station.

23. The mobile device of claim 17, wherein the means for updating the set of carriers comprises means for adding information about the candidate carrier in response to the difference being less than the predetermined value and the power level of the forward link pilot from the first base station exceeding a second threshold.

24. The mobile device of claim 17, wherein the means for updating the set of carriers comprises means for removing information about the candidate carrier from the set of carriers in response to the difference exceeding the predetermined value or the power level of the forward link pilot from the first base station being below a second threshold.

25. The mobile device of claim 17, further comprising means for transmitting to the first base station on a reverse link carrier in response to the updating the set of carriers.

26. The mobile device of claim 17, wherein mobile device is configured to process signals having a format specified by TIA-856 (Telecommunications Industry Association) standards.

27. The mobile device of claim 17, wherein the candidate signal comprises a hotspot carrier or a partial overlay carrier in the cellular network.

28. The mobile device of claim 17, wherein the first power level comprises an average of an estimated transmit power for reverse link communication with the first base station and the second power level comprises an average of the transmit power for reverse link communication with the second base station.

29. The mobile device of claim 28, wherein the means for determining the difference comprise means for subtracting the first power level from the second power level or means for subtracting the second power level from the first power level.

30. The mobile device of claim 28, further comprising means for filtering the first power level to determine the average of the estimated transmit power for reverse link communication with the first base station, and means for filtering the second power level to determine the average of the transmit power for reverse link communication with the second base station.

31. A computer program product comprising: a computer readable medium comprising instructions configured to cause a computer to:
receive a candidate carrier from a first base station at the mobile device;
determine a first reverse link transmit power level associated with the candidate carrier based on a pilot power level of the received candidate carrier;
determine a difference between the first reverse link transmit power level and a second reverse link transmit power level corresponding to a second carrier used by the mobile device to communicate with a second base station; and
update a set of carriers available to the mobile device for communicating on the cellular network based on the difference between the first reverse link transmit power level and the second reverse link transmit power level.

32. A mobile device comprising:
a receiver configured to receive forward link signals associated with base stations in a cellular network;
a transmitter configured to send reverse link signals corresponding to the forward link signals;
a processor coupled to the receiver and the transmitter, the processor configured to decode the forward link signals and to send data on the corresponding reverse link signals based on an active carrier set;
a memory coupled to the processor and configured to store the active carrier set comprising information about carriers available to the mobile device for communicating in the cellular network,
wherein the processor is further configured to estimate a transmit power level of a reverse link signal corresponding to a candidate forward link signal based on a pilot power level of the candidate forward link signal and to update the active carrier set based on a difference between the estimated reverse link transmit power level corresponding to the candidate forward link signal and a reverse link transmit power level of a reference carrier in the active set.

33. A method of wireless communication performed by a mobile device, the method comprising:
communicating with a first base station on a first carrier;
detecting availability of a hotspot carrier;
measuring a pilot power level of the hotspot carrier;
estimating a reverse link transmit power associated with the hotspot carrier based on the pilot power level;
adding information relating to the hotspot carrier to an active set of the mobile device in response to the pilot power level of the hotspot carrier exceeding a first threshold and a difference between the estimated reverse link transmit power and a reverse link transmit power for communicating with the first base station being below a second threshold; and
removing information relating to the hotspot carrier from the active set of the mobile device in response to the pilot power level of the hotspot carrier being less than the first predetermined threshold value or the difference between the estimated reverse link transmit power and the reverse link transmit power for communicating with the first base station exceeding the second threshold.

* * * * *